United States Patent Office 3,159,630
Patented Dec. 1, 1964

3,159,630
PYRIMIDINYL O-ALKYL PHOSPHORAMIDATES
AND PHOSPHORAMIDOTHIOATES
Raymond H. Rigterink, Midland, Mich., assignor to The Dow Chemical Company, Midland, Mich., a corporation of Delaware
No Drawing. Filed June 14, 1961, Ser. No. 116,956
6 Claims. (Cl. 260—256.4)

The present invention is directed to the O-pyrimidinyl O-alkyl phosphoramidates and phosphoramidothioates corresponding to the formula

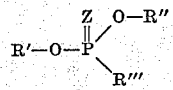

In this and succeeding formulae, R' represents pyrimidinyl, lower alkyl-pyrimidinyl or phenyl-pyrimidinyl, R'' represents lower alkyl, R''' represents amino or lower alkylamino, and Z represents oxygen or sulfur. In the present specification and claims, the expression "lower alkyl" is employed to refer to the alkyl radicals containing from 1 to 5 carbon atoms, inclusive. These compounds are liquid or crystalline solid materials which are somewhat soluble in many common organic solvents and of very low solubility in water. The compounds are useful as parasiticides and are adapted to be employed as active toxicants in compositions for the control of mite, insect, bacterial and fungal organisms such as aphids, beetles, ticks, worms, Rhizoctonia solani and ascarids. The compounds are also useful as herbicides for the control of a number of undesirable grass and weed species such as pigweed.

The novel compounds of the present invention may be prepared by several methods. In a preferred method, the compounds are prepared by reacting an O-lower alkyl phosphoramidochloridate or phosphoramidochloridothioate corresponding to the formula

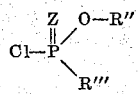

with an alkali metal salt of a pyrimidinol having the formula R'OH. The reaction conveniently is carried out in an inert organic liquid such as carbon tetrachloride, chloroform, benzene, toluene, isobutyl methyl ketone, or methylene dichloride. The amounts of the reagents to be employed are not critical, some of the desired product being obtained when employing any proportion of the reactants. In the preferred method of operation, good results are obtained when employing substantially equimolecular proportions of the alkali metal pyrimidinol and phosphoramidochloridate or phosphoramidochloridothioate. The reaction takes place smoothly at the temperature range of from 20° to 100° C. with the production of the desired product and alkali metal chloride byproduct.

In carrying out the reaction, the reactants are mixed and contacted together in any convenient fashion, and the resulting mixture maintained for a period of time in the reaction temperature range to complete the reaction. Following the completion of the reaction, the reaction mixture is washed with water and any organic reaction medium removed by fractional distillation under reduced pressure to obtain the desired product as a residue. This product may be further purified by conventional procedures such as washing with water and dilute aqueous alkali metal hydroxide, solvent extraction and recrystallization.

In an alternative procedure, the new compounds may be prepared by reacting an O-lower alkyl phosphorodichloridate or O-lower alkyl phosphorodichloridothioate having the structure

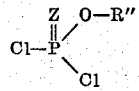

with an alkali metal salt of a pyrimidinol as previously defined to form an intermediate O-pyrimidinyl O-lower alkyl phosphorochloridate or phosphorochloridothioate having the structure

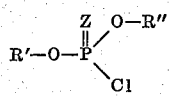

This intermediate is thereafter reacted with ammonia or a lower alkyl amine to produce the desired O-pyrimidinyl O-lower alkyl phosphoramidate or phosphoramidothioate product. The reaction conveniently is carried out in a reaction medium such as benzene, chloroform, carbon tetrachloride or methylene chloride. Good results are obtained when employing substantially equimolecular proportions of the O-lower alkyl phosphorodichloridate or phosphorodichloridothioate and alkali metal pyrimidinolate and at least 2 molecular proportions of lower alkyl amine. The reaction with the alkali metal pyrimidinolate is somewhat exothermic and is carried out at temperatures of from −40° to 50° C. The reaction between the O-pyrimidinyl O-lower alkyl phosphorochloridate or phosphorochloridothioate and ammonia or lower alkyl amine is also exothermic and takes place at the temperature range of from −10° to 30° C. The temperature may be controlled by regulating the rate of mixing and contacting the reactants together and by external cooling. The byproduct in both steps of the reaction is chloride. In the first step, the chloride appears as alkali metal chloride. In the second step, the chloride is removed as the hydrochloride salt of the amine or ammonium reactants. Following the reaction, the desired product may be separated in accordance with the conventional procedures as previously described.

The following examples merely illustrate the invention and are not to be construed as limiting:

*Example 1.—O-(2,6-Dimethyl-4-Pyrimidinyl) O-Methyl N-Methyl Phosphoramidothioate*

2,6-dimethyl-4-pyrimidinol (12.4 grams; 0.1 mole), 6.9 grams (0.05 mole) of potassium carbonate, and 250 milliliters of benzene were mixed together and heated at the boiling temperature with stirring to produce the potassium salt of 2,6-dimethyl-4-pyrimidinol. The heating was carried out with the distillation of some of the reaction medium together with the water of reaction as formed. This solvent mixture was diluted with 50 milliliters of dimethylformamide and 16 grams (0.1 mole) of O-methyl N-methyl phosphoramidochloridothioate added rapidly thereto with stirring. During the addition, the temperature of the reaction mixture rose to 29° C. Stirring was thereafter continued and the temperature raised to from 60° C. to 70° C., and retained thereat for 2 hours to complete the reaction. The reaction mixture was thereafter successively washed with water and dilute aqueous sodium hydroxide and the reaction medium removed by fractional distillation under reduced pressure to obtain an O-(2,6-dimethyl-4-pyrimidinyl) O-methyl N-methyl phosphoramidothioate product as a liquid residue having a refractive index n/D of 1.5420 at 25° C.

*Example 2.—O-(4-Methyl-2-Pyrimidinyl) O-Methyl N-Methyl Phosphoramidothioate*

4-methyl-2-pyrimidinol monohydrochloride (14.7 grams; 0.1 mole), aqueous 50 percent sodium hydroxide (equivalent to 0.2 mole of NaOH), 10 milliliters of water and 250 milliliters of benzene were mixed together and heated at the boiling temperature to prepare the sodium salt of 4-methyl-2-pyrimidinol. The heating was carried out with the distillation of some of the reaction medium together with the water of reaction as formed. This mixture wis diluted with 50 milliliters of dimethylformamide and 0.1 mole of O-methyl N-methyl phosphoramidochloridothioate added rapidly thereto with stirring. Following the addition, the temperature of the reaction mixture was raised to 60° C. and maintained with stirring at from 60° to 65° C. for 2 hours to complete the reaction. The reaction mixture was thereafter successively washed with water, and the reaction medium removed from the washed mixture by fractional distillation under reduced pressure. As a result of these operations, there was obtained an O-(4-methyl-2-pyrimidinyl) O-methyl N-methyl phosphoramidothioate product as a liquid residue having a refractive index of n/D of 1.5335 at 25° C.

*Example 3.—O-(2,6-Dimethyl-4-Pyrimidinyl) O-Methyl N-Isopropyl Phosphoramidate*

2,6-dimethyl-4-pyrimidinol (0.1 mole), aqueous 50 percent sodium hydroxide (equivalent to 0.1 mole of NaOH) and 250 milliliters of isobutyl methyl ketone were mixed together and heated at the boiling temperature as previously described to prepare the sodium salt of 2,6-dimethyl-4-pyrimidinol. O-Methyl phosphorodichloridate (14.9 grams; 0.1 mole) was added dropwise with stirring to the above mixture containing the sodium salt compound. The addition was carried out at a temperature of −40° C. and over a period of about 6 minutes. Stirring was thereafter continued for one hour as the temperature of the reaction mixture was allowed to raise to about 0° C. To this mixture was then added with stirring 11.8 grams (0.2 mole) of isopropylamine. The addition was carried out in about 5 minutes and at a temperature of from −10° to 0° C. Stirring was thereafter continued for one hour as the temperature was allowed to raise to room temperature to complete the reaction. The reaction mixture was then filtered and the reaction medium removed from the filtrate by fractional distillation under reduced pressure to obtain an O-(2,6-dimethyl-4-pyrimidinyl) O-methyl N-isopropyl phosphoramidate product as a liquid residue having a refractive index n/D of 1.4844 at 25° C.

*Example 4.—O-(5-Phenyl-4-Pyrimidinyl) O-Sec. Butyl N-Methyl Phosphoramidothioate*

5-phenyl-4-pyrimidinol (8.6 grams; 0.05 mole), aqueous 50 percent sodium hydroxide (equivalent to 0.05 mole of NaOH), 5 milliliters of water and 200 milliliters of benzene were mixed together and heated at the boiling temperature with stirring to prepare the sodium salt of 5-phenyl-4-pyrimidinol. The heating was carried out with the distillation of some of the reaction medium together with the water of reaction as formed. This mixture was diluted with 50 milliliters of dimethyl formamide and 10.1 grams (0.05 mole) of O-sec. butyl N-methyl phosphoramidochloridothioate added rapidly thereto with stirring. During the addition, the temperature of the reaction mixture rose from 19° to 23° C. The reaction mixture was then heated to about 60° C. and maintained thereat for 2 hours with stirring to complete the reaction. The reaction mixture was then washed with water and the reaction medium removed by fractional distillation under reduced pressure to obtain an O-(5-phenyl-4-pyrimidinyl) O-sec. butyl N-methyl phosphoramidothioate product as a crystalline solid residue. This product was recrystallized from a petroleum ether boiling at from 86° to 100° C. and found to melt at 63°–64.5° C. and to have a sulfur content of 9.97 percent as compared to a theoretical content of 9.95 percent.

In a similar manner, other products of the present invention are prepared as follows:

O - (5 - phenyl-4-pyrimidinyl) O-methyl N-sec. butyl phosphoramidothioate (with n/D of 1.5510 at 25° C.) by reacting together O-methyl phosphorodichloridothioate, potassium 5-phenyl-4-pyrimidinolate and sec. butylamine.

O-(5-phenyl-2-pyrimidinyl) O-methyl N-methyl phosphoramidate (molecular weight of 279) by reacting together potassium 5-phenyl-2-pyrimidinolate and O-methyl N-methyl phosphoramidochloridate.

O-(2-pyrimidinyl) O-methyl N-isopropyl phosphoramidate (molecular weight of 231) by reacting together potassium 2-pyrimidinolate and O-methyl N-isopropyl phosphoramidochloridate.

O - (2,6-dimethyl-4-pyrimidinyl) O-methyl N-propyl phosphoramidate (molecular weight of 259) by reacting together sodium 2,6-dimethyl-4-pyrimidinolate and O-methyl N-propyl phosphoramidochloridate.

O - (2,6-dimethyl-4-pyrimidinyl) O-methyl N-dimethyl phosphoramidothioate (n/D of 1.5042 at 25° C.) by reacting together sodium 2,6-dimethyl-4-pyrimidinolate and O-methyl N-dimethyl phosphoramidochloridothioate.

O-(5,6-dimethyl-2-pyrimidinyl) O-methyl N-methyl phosphoramidate (molecular weight of 231) by reacting together sodium 5,6-dimethyl-2-pyrimidinolate and O-methyl N-methyl phosphoramidochloridate.

O-(4-pyrimidinyl) O-ethyl N-methyl phosphoramidothioate (molecular weight of 233) by reacting together sodium 4-pyrimidinolate and O-ethyl N-methyl phosphoramidochloridothioate.

O-(4,6-dimethyl-2-pyrimidinyl) O-amyl N-amyl phosphoramidothioate (molecular weight of 359) by reacting together sodium 4,6-dimethyl-2-pyrimidinolate and O-amyl N-amyl phosphoramidochloridothioate.

2-(6-phenyl-4-pyrimidinyl) O-methyl N-ethyl phosphoramidothioate (molecular weight of 309) by reacting together sodium 6-phenyl-4-pyrimidinolate and O-methyl N-ethyl phosphoramidochloridothioate.

O - (2,6 - dimethyl - 4 - pyrimidinyl) O-methyl N-propyl phosphoramidothioate (n/D of 1.5121 at 25° C.) by reacting together O-methyl phosphorodichloridothioate, sodium 2,6-dimethyl-4-pyrimidinolate and propylamine.

O-(4,6-dimethyl-2-pyrimidinyl) O-methyl N-sec. butyl phosphoramidothioate (n/D of 1.5192 at 25° C.) by reacting together sodium 4,6-dimethyl-2-pyrimidinolate and O-methyl n-sev. butyl phosphoramidochloridothioate.

O-(2,6-diethyl-5-methyl-4-pyrimidinyl) O-methyl N-propyl phosphoramidothioate (n/D of 1.5096 at 25° C. by reacting together O-methyl phosphorodichloridothioate, potassium 2,6-diethyl-5-methyl-4-pyrimidinolate and propylamine.

O-(4,6-dimethyl-2-pyrimidinyl) O-isobutyl N-methyl phosphoramidothioate (n/D of 1.5013 at 25° C.) by reacting together sodium 4,6-dimethyl-2-pyrimidinolate and O-isobutyl N-methyl phosphoramidochloridothioate.

O-(2,6-diethyl-5-methyl-4-pyrimidinyl) O-propyl N-propyl phosphoramidothioate (n/D of 1.4985 at 25° C.) by reacting together sodium 2,6-diethyl-5-methyl-4-pyrimidinolate and O-propyl N-propyl phosphoramidochloridothioate.

O-(2-isopropyl-6-methyl-4-pyrimidinyl) O-methyl N-isopropyl phosphoramidothioate (n/D of 1.5078 at 25° C.) by reacting together sodium 2-isopropyl-6-methyl-4-pyrimidinolate and O-methyl N-isopropyl phosphoramidochloridothioate.

O-(2,6-dibutyl-4-pyrimidinyl) O-propyl N-propyl phosphoramidothioate (molecular weight of 387) by reacting together sodium 2,6-dibutyl-4-pyrimidinolate and O-propyl N-propyl phosphoramidochloridothioate.

O-(4,5,6-trimethyl-2-pyrimidinyl) O-methyl N-methyl phosphoramidothioate (molecular weight of 261) by reacting together sodium 4,5,6-trimethyl-2-pyrimidinolate and O-methyl N-methyl phosphoramidochloridothioate.

The new compounds of the present invention are useful as herbicides and parasiticides for the control of a number of plants, mite, insect and bacterial organisms. For such use, the products are dispersed on a finely divided solid and employed as dusts. Also, such mixtures may be dispersed in water with the aid of a wetting agent and the resulting aqueous suspensions employed as sprays. In other procedures, the products are employed as constituents of solvent solutions, oil-in-water or water-in-oil emulsion, or water dispersions with or without the addition of wetting, dispersing or emulsifying agents. In representative operations, aqueous compositions containing 100 parts by weight of O-(2,6-dimethyl-4-pyrimidinyl) O-methyl N-methyl phosphoramidothioate per million parts by weight of the compositions give 100 percent controls of two spotted spider mites.

The pyrimidinols employed as starting materials in accordance with the present teachings can be prepared in accordance with known methods. Thus, the pyrimidinols such as the 2-pyrimidinols and 4-pyrimidinols are prepared by the digestion of 2-mercaptopyrimidine with concentrated hydrochloric acid and by heating 2,4-dichloropyrimidine with concentrated hydriodic acid and phosphorus. The substituted 2-pyrimidinols and 4-pyrimidinols are prepared by the condensation of urea with a suitable β-diketone and by the condensation of an acylamidine such as benzoylamidine with a suitable β-ketone ester. Suitable acylamidines, β-diketones and β-ketone esters include those of the following formulate

Thiourea undergoes the same cyclization reactions as urea so that the substituted pyrimidinols can be prepared by conversion and hydrolyzation of the corresponding thiourea derivatives. Also, nitriles such as phenylacetonitrile may be reacted with formamide in ammonia to produce 5-phenyl-4-aminopyrimidine or the alkylnitriles heated with an alkali alkoxide or sodamide to produce alkyl substituted 4-amino-pyrimidines. These aminopyrimidines may be readily hydrolyzed to obtain the corresponding pyrimidinols.

I claim:
1. A compound corresponding to the formula

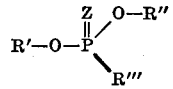

wherein R' represents a member of the group consisting of pyrimidinyl, lower alkyl-pyrimidinyl and phenyl-pyrimdinyl, R" represents lower alkyl, R'" represents a member of the group consisting of amino and lower alkyl-amino, and Z represents a member of the group consisting of oxygen and sulfur.

2. O-(2,6-dimethyl-4-pyrimidinyl) O-methyl N-methyl phosphoramidothioate.
3. O-(2,6-dimethyl-4-pyrimidinyl) O-methyl N-isopropyl phosphoramidate.
4. O-(4,6-dimethyl-2-pyrimidinyl) O-isobutyl N-methyl phosphoramidothioate.
5. O-(2-isopropyl-6-methyl-4-pyrimidinyl) O-methyl N-isopropyl phosphoramidothioate.
6. O-(4-methyl-2-pyrimidinyl) O-methyl N-methyl phosphoramidothioate.

References Cited in the file of this patent
UNITED STATES PATENTS

| | | |
|---|---|---|
| 2,751,384 | Coover et al. | June 19, 1956 |
| 2,814,636 | Stahmann et al. | Nov. 26, 1957 |
| 2,848,475 | Schmidt | Aug. 19, 1958 |
| 2,861,812 | Sallmann | Nov. 25, 1958 |

FOREIGN PATENTS

| | | |
|---|---|---|
| 713,278 | Great Britain | Aug. 11, 1954 |